US012595070B2

(12) United States Patent
Schneider et al.

(10) Patent No.: US 12,595,070 B2
(45) Date of Patent: Apr. 7, 2026

(54) METHOD OF OPERATING A ROTORCRAFT IN A SINGLE ENGINE OPERATION MODE

(71) Applicant: AIRBUS HELICOPTERS DEUTSCHLAND GMBH, Donauwörth (DE)

(72) Inventors: Sascha Schneider, Meitingen (DE); Daniel Reber, Gröbenzell (DE)

(73) Assignee: AIRBUS HELICOPTERS DEUTSCHLAND GMBH, Donauwörth (DE)

( * ) Notice: Subject to any disclaimer, the term of this patent is extended or adjusted under 35 U.S.C. 154(b) by 46 days.

(21) Appl. No.: 18/633,045

(22) Filed: Apr. 11, 2024

(65) Prior Publication Data

US 2024/0391600 A1 Nov. 28, 2024

(30) Foreign Application Priority Data

May 24, 2023 (EP) .................................... 23175083

(51) Int. Cl.
| | |
|---|---|
| *B64D 31/09* | (2024.01) |
| *B64C 27/00* | (2006.01) |
| *B64F 5/60* | (2017.01) |

(52) U.S. Cl.
CPC ................ *B64D 31/09* (2024.01); *B64F 5/60* (2017.01); *B64C 27/00* (2013.01)

(58) Field of Classification Search
CPC ........... B64D 31/09; B64F 5/60; B64C 27/00; B64C 27/006; B64C 27/57;
(Continued)

(56) References Cited

U.S. PATENT DOCUMENTS

| | | | | |
|---|---|---|---|---|
| 7,159,817 B2 * | 1/2007 | VanderMey | ............ | B64C 39/08 244/17.23 |
| 8,798,814 B1 * | 8/2014 | Spencer, V | .............. | G08G 5/21 701/4 |

(Continued)

FOREIGN PATENT DOCUMENTS

| | | |
|---|---|---|
| EP | 2631172 A2 | 8/2013 |
| EP | 2631172 A3 | 3/2014 |

(Continued)

OTHER PUBLICATIONS

European Search Report for European Application No. EP 23175083. 7, Completed by the European Patent Office, Dated Nov. 8, 2023, 7 pages.

*Primary Examiner* — Mussa A Shaawat
(74) *Attorney, Agent, or Firm* — BROOKS KUSHMAN P.C.

(57) ABSTRACT

A method of operating a rotorcraft with at least one main rotor and at least two engines, comprising: determining whether the rotorcraft is operated in an AEO mode wherein the at least two engines are powering the at least one main rotor, or in a SEO mode wherein only a first engine of the at least two engines is powering the at least one main rotor while a second engine of the at least two engines is inactive; if the rotorcraft is operated in the SEO mode, monitoring the first engine to enable detection of engine failures; and if during monitoring of the first engine an engine failure of the first engine is detected, entering into autorotation of the at least one main rotor upon detection of the engine failure by adjusting main rotor actuators of the at least one main rotor.

20 Claims, 2 Drawing Sheets

(58) Field of Classification Search

CPC ........... G05D 2109/25; G05D 2105/22; G05D
1/485; G05D 1/854

See application file for complete search history.

(56) References Cited

U.S. PATENT DOCUMENTS

| | | | |
|---|---|---|---|
| 8,989,921 B2 * | 3/2015 | Nannoni | G05D 1/0858 |
| | | | 701/16 |
| 9,193,450 B2 * | 11/2015 | Worsham, II | G05D 1/105 |
| 9,242,727 B1 * | 1/2016 | Alvarez | B64D 43/00 |
| 9,266,607 B2 * | 2/2016 | Fink | B64C 39/04 |
| 9,381,995 B2 * | 7/2016 | Mores | B64C 9/06 |
| 9,511,872 B2 * | 12/2016 | Grieser | B64C 27/12 |
| 9,527,577 B2 * | 12/2016 | Embacher | B64C 3/385 |
| 9,863,402 B2 * | 1/2018 | Perley | F03D 1/0675 |
| 10,124,907 B1 * | 11/2018 | Gavrilets | G01C 23/00 |
| 10,279,904 B2 * | 5/2019 | Chen | B64C 29/02 |
| 10,556,668 B2 * | 2/2020 | Grohmann | B64C 27/04 |
| 11,194,349 B2 * | 12/2021 | White | B64C 27/006 |
| 11,554,862 B2 * | 1/2023 | Kiesewetter | B64C 27/20 |
| 11,560,237 B2 * | 1/2023 | Zoppitelli | B64C 27/006 |
| 2006/0151666 A1 * | 7/2006 | VanderMey | B64C 29/0016 |
| | | | 244/12.3 |
| 2007/0164167 A1 | 7/2007 | Bachelder et al. | |
| 2013/0221153 A1 * | 8/2013 | Worsham, II | G05D 1/105 |
| | | | 244/17.13 |
| 2014/0263820 A1 * | 9/2014 | Smith | B64D 27/33 |
| | | | 244/17.19 |
| 2015/0014475 A1 * | 1/2015 | Taylor | B64C 29/0025 |
| | | | 244/6 |
| 2016/0144971 A1 * | 5/2016 | Vallart | F02C 9/42 |
| | | | 701/3 |
| 2016/0378121 A1 * | 12/2016 | Shue | G08G 5/26 |
| | | | 701/7 |
| 2017/0137139 A1 * | 5/2017 | Connaulte | H10N 10/17 |
| 2018/0065738 A1 * | 3/2018 | Lappos | B64C 27/57 |
| 2018/0129226 A1 * | 5/2018 | Rogers | B64C 27/006 |
| 2018/0208295 A1 * | 7/2018 | Mores | B64D 25/00 |
| 2018/0273168 A1 * | 9/2018 | Page | B64C 27/24 |
| 2019/0112039 A1 * | 4/2019 | Pfaller | B64C 27/82 |
| 2019/0135411 A1 * | 5/2019 | Gonzalez | B64C 27/54 |
| 2019/0340937 A1 * | 11/2019 | Villa | G06Q 10/047 |
| 2020/0277072 A1 * | 9/2020 | Zoppitelli | B64D 35/04 |
| 2021/0122460 A1 * | 4/2021 | Acee | B64D 35/04 |
| 2023/0106444 A1 * | 4/2023 | Giannini | B64C 9/00 |
| | | | 244/7 C |
| 2023/0211876 A1 * | 7/2023 | Parsons | B64C 27/57 |
| | | | 244/76 R |
| 2023/0322363 A1 * | 10/2023 | Hill | B64C 13/50 |
| | | | 244/76 R |
| 2025/0042564 A1 * | 2/2025 | Heel | B64D 27/357 |

FOREIGN PATENT DOCUMENTS

| | | | |
|---|---|---|---|
| EP | 3264215 A1 | 1/2018 | |
| EP | 3738888 A1 | 11/2020 | |

* cited by examiner

METHOD OF OPERATING A ROTORCRAFT IN A SINGLE ENGINE OPERATION MODE

CROSS-REFERENCE TO RELATED APPLICATIONS

This application claims priority to European patent application No. EP 23175083.7 filed on May 24, 2023, the disclosure of which is incorporated in its entirety by reference herein.

TECHNICAL FIELD

The disclosure is related to a method of operating a rotorcraft that comprises at least one main rotor and at least two engines for powering the at least one main rotor in one of an All Engines Operative mode, wherein the at least two engines are powering the at least one main rotor, and a Single Engine Operation mode, wherein only one engine of the at least two engines is powering the at least one main rotor while another engine of the at least two engines is inactive. The disclosure is further related to a flight control system for a rotorcraft which is configured to perform such a method, and to a rotorcraft comprising such a flight control system.

BACKGROUND

More generally, in a rotorcraft that comprises at least one main rotor and at least two engines for powering the at least one main rotor in one of an All Engines Operative (AEO) mode and a Single Engine Operation (SEO) mode, the SEO mode is mainly intended to enable in cruise flight during a given flight mission a reduction in fuel consumption of the rotorcraft, as well as a reduction of polluting emissions and a contribution to decarbonization, and/or an increase of the rotorcraft's flight endurance or range. To this end, a selected one of the at least two engines is set to an inactive state by shutting down or lowering down to desynchronization, i. e. zero power, the selected one of the at least two engines such that another one of the at least two engines is required to handle the flight mission alone with an increased power request. In fact, even when operating in a comparatively high loaded power regime with the increased power request, the other one of the at least two engines will generally consume less fuel than required by the selected one and the other one of the at least two engines together in a comparatively low loaded power regime with reduced power request.

If a given rotorcraft is operated in SEO mode, a respective inactive engine, i. e. the engine that is set to an inactive state, is usually restarted at the end of cruise flight to switch the operating mode of the given rotorcraft back to AEO mode. However, restarting of the inactive engine may also be required e. g. if a currently operating engine, i. e. the engine that handles the flight mission alone with an increased power request, fails or if additional power is required during the flight mission.

In any case the SEO mode represents an unusual power situation of a rotorcraft as conventionally the only power situation in which an engine is inactive is the case of an actual engine failure. Therefore, operating a rotorcraft in SEO mode requires a suitable monitoring of the correct functioning of the currently operating engine to enable performance of suitable actions upon occurrence of failure conditions of the currently operating engine in order to avoid a non-recoverable flight situation, thus, ensuring continued safe flight and landing of the rotorcraft.

However, if such failure conditions of the currently operating engine are detected, restarting of the inactive engine in the SEO mode during a flight mission may require more time than the at least one main rotor of a given rotorcraft may require to end up in a critical and non-recoverable low rotor speed state, which is frequently characterized by a low rotor inertia, if the respective suitable actions are not performed. The situation becomes even more severe if an autopilot of the given rotorcraft is engaged and/or the rotor inertia is low and the pilot is e. g. less attentive. For instance, if the autopilot of the given rotorcraft is engaged, certification demands at least three seconds hand-off before any pilot action occurs, which might conceivably end in a non-recoverable flight situation after detection of the above-described failure conditions of the currently operating engine.

The document EP 3 738 888 A1 describes a method for operating a rotorcraft, for instance a helicopter, which comprises a plurality of engines which are configured to provide motive power to the rotorcraft, and at least one rotor coupled to the plurality of engines. More specifically, the rotorcraft may be operated in an Asymmetric Operating Regime (AOR), in which at least one first engine of the plurality of engines is a currently operating engine that is operated in an active mode to provide motive power to the rotorcraft, while at least one second engine of the plurality of engines is inactive and, thus, operated in a standby mode to provide substantially no motive power to the rotorcraft. If a failure of the currently operating engine is detected, one or more flight control inputs of the at least one rotor is/are adjusted to compensate for a reduction in the rotor speed, which results from the failure of the currently operating engine. The flight control input(s) is/are adjusted to increase the rotor speed so that the at least one rotor rotates at substantially the same rotor speed as before the failure of the currently operating engine. Furthermore, an increase in power output of the inactive engine is commanded. Moreover, further adjustments to the flight control input(s) are made. For instance, the flight control input(s) may be reverted back to respective pre-engine-failure values.

Furthermore, the documents EP 3 264 215 A1, EP 2 631 172 A2, and US 2007/164167 A1 describe methods of entering main rotors of respective rotorcrafts into autorotation upon detection of engine failures. However, the respective rotorcrafts are not operated in SEO modes and, thus, the engine failures occur at engines which are operating for powering main rotors of the respective rotorcrafts, but not to currently operating engines in SEO modes of the rotorcrafts. Accordingly, the documents EP 3 264 215 A1, EP 2 631 172 A2, and US 2007/164167 A1 do not describe suitable actions which should be performed in a rotorcraft in which a main rotor is powered by a currently operating engine in SEO mode in the case of occurrence of an engine failure of the currently operating engine.

The document US2018065738 describes a rotary wing aircraft that operates in Single Engine Operation in certain scenarios. Measurement of the state of an automatic restart system on engines determines an associated energy state of the aircraft for autorotation initiation calculations.

SUMMARY

It is an object of the present disclosure to provide a new method of operating a rotorcraft with at least two engines in response to detecting a failure of a single engine that is powering at least one main rotor of the rotorcraft in a SEO mode, wherein the new method is suitable to enable a safe and reliable continuation of a given flight mission at a pre-failure cruising altitude and/or along a pre-failure flight route. Another object of the present disclosure is to provide a new flight control system for a rotorcraft which is configured to perform such a method, and to provide a new rotorcraft comprising such a flight control system.

One of the above-described objects is solved by a method of operating a rotorcraft that is flying in cruise mode with an associated flight speed at an associated cruising altitude. More specifically, according to the present disclosure a method of operating a rotorcraft that is flying in cruise mode with an associated flight speed at an associated cruising altitude, wherein the rotorcraft comprises at least one main rotor with associated main rotor actuators, at least two engines for powering the at least one main rotor, and a flight control system for controlling at least the main rotor actuators, comprises determining whether the rotorcraft is operated in an AEO mode wherein the at least two engines are powering the at least one main rotor, or in a SEO mode wherein only a first engine of the at least two engines is powering the at least one main rotor while a second engine of the at least two engines is inactive. In response to determining that the rotorcraft is operated in the SEO mode, the first engine that is powering the at least one main rotor is monitored to enable detection of engine failures. If during monitoring of the first engine an engine failure of the first engine is detected, the at least one main rotor is entered into autorotation upon detection of the engine failure by adjusting at least the main rotor actuators.

Preferably, the above-described method steps are performed in an automated process. Accordingly, an accurate power loss and engine failure handling in the SEO mode may be guaranteed, thus, increasing flight safety and reducing crew workload significantly. Furthermore, by performing an automated entry into autorotation and preferably a subsequent automated stabilization of the autorotation any critical and non-recoverable low main rotor speeds and excessive sink rates may advantageously be prevented in the event of a power loss in the SEO mode. Moreover, by reducing a current flight speed of the rotorcraft automatically to a best rate of climb speed Vy or to a best range speed a respective power request during the autorotation and during subsequent recovery of the initial flight state after engine in-flight restarting may be reduced. In addition, an automated in-flight optimization of the combination of the flight and main rotor speed through adjusting respective controls, i. e. collective pitch, cyclic, pedals and other aerodynamic surfaces, in stabilized autorotation descent advantageously minimizes height loss during the engine in-flight restarting. Finally, automated recovery of an initial pre-failure cruise altitude and/or flight route ensures safe continuation of the flight in an One Engine Inoperative (OEI) condition with an optimized speed.

According to some aspects, the method further comprises adjusting a current rotor speed of the at least one main rotor to nominal autorotation rotor speed by re-adjusting at least the main rotor actuators.

According to some aspects, the method further comprises reducing a current flight speed of the rotorcraft to a best rate of climb speed or to a best range speed.

According to some aspects, the method further comprises stabilizing the autorotation of the at least one main rotor.

Stabilizing the autorotation of the at least one main rotor may comprise minimizing height loss of the rotorcraft via an in-flight optimization of the current flight speed and the current rotor speed by further re-adjusting at least the main rotor actuators.

According to some aspects, the method further comprises restarting the second engine of the at least two engines, which is inactive in the Single Engine Operation mode.

Restarting of the second engine of the at least two engines, which is inactive in the Single Engine Operation mode, may be initiated upon detection of the engine failure.

According to some aspects, the method further comprises recovering the associated flight speed and the associated cruising altitude by powering the at least one main rotor using the restarted second engine.

Recovering the associated flight speed and the associated cruising altitude may comprise re-adjusting at least the main rotor actuators.

According to some aspects, the method further comprises resuming flying in cruise mode with the associated flight speed at the associated cruising altitude in an OEI mode wherein only the second engine of the at least two engines is powering the at least one main rotor while the first engine of the at least two engines is inoperative due to the detected engine failure.

According to some aspects, the method further comprises, if during monitoring of the first engine an engine failure of the first engine is detected, emitting visual and/or audible indications representing warnings and cautions.

Emitting visual and/or audible indications may further comprise emitting procedure guidance to a pilot of the rotorcraft for assisting the pilot in performing the method described hereinabove.

Advantageously, a suitable indication system, i. e. audio and visual, may provide warning and caution information to a pilot of the rotorcraft and guide a crew of the rotorcraft through the method described hereinabove, for instance, by providing visual indications of an optimized collective pitch position and flight speed.

Another one of the above-described objects is solved by a rotorcraft comprising at least one main rotor with associated main rotor actuators, at least two engines for powering the at least one main rotor, and a flight control system for controlling at least the main rotor actuators. More specifically, according to the present disclosure the rotorcraft is adapted for operating in an AEO mode wherein the at least two engines are powering the at least one main rotor, or in a SEO mode wherein only a first engine of the at least two engines is powering the at least one main rotor while a second engine of the at least two engines is inactive. The flight control system executes a SEO mode autopilot function during flight of the rotorcraft in cruise mode with an associated flight speed at an associated cruising altitude in the SEO mode if, during monitoring of the first engine, an engine failure of the first engine is detected, and the SEO mode autopilot function implements the method described hereinabove.

According to some aspects, the flight control system immediately restarts the second engine of the at least two engines, which is inactive in the SEO mode, if the SEO mode autopilot function is executed.

Advantageously, the SEO mode autopilot function supports a pilot of the rotorcraft after detection of a failure of the first engine that is currently operating in the SEO mode in bringing the rotorcraft in autorotation at safe speed, starting the inactive engine and, after the inactive engine is started, bringing the rotorcraft back to the initial flight state with minimum height loss. Thereby, the SEO mode autopilot function preferably implements the method described hereinabove in an automated manner. However, in an alternative implementation the SEO mode autopilot function may be realized for providing e. g. only steering information to the pilot of the rotorcraft such that the pilot performs the method steps described hereinabove.

In an illustrative realization, the SEO mode autopilot function implements the following functionalities:

identification of a failure state in SEO mode during flight along a predetermined flight route with an associated flight speed at an initial cruising altitude, e. g. by continuously monitoring an engine state of a currently operating engine and/or a respective main rotor speed;

automated entry into autorotation in case of a power loss in SEO mode by means of adjusting suitable controls such as e. g. collective pitch, cyclic and pedals commands and other aerodynamic surfaces;

automated recovery of rotor speed to nominal autorotation rotor speed by means of adjusting the controls, in particular collective pitch and cyclic command;

automated reduction of the flight speed to best rate of climb speed Vy for sink rate reduction during unpowered flight, or to a best range speed;

automated stabilization of the autorotation and simultaneous minimization of height loss via an in-flight optimization of the flight and main rotor speed by means of suitable commands to cyclic, collective pitch, pedals and other aerodynamic surfaces;

automated recovery of the initial cruising altitude and/or the predetermined flight route after a successful restarting of a currently inactive engine by means of a fast or normal restart; and safe continuation of the flight in OEI condition with an optimized flight speed.

In addition, audio and/or visual indications of warning and cautions, as well as procedure guidance may be provided to a crew of the rotorcraft.

Preferably, the SEO mode autopilot function is automatically armed, i. c. no dedicated pilot action is required therefore, at the point in time when the SEO mode is entered, meaning that the SEO mode autopilot function is in stand-by and monitors the at least two engines and the rotorcraft state for confirming normal operation. The armament of the SEO mode autopilot function is preferably indicated to the pilot on the rotorcraft's display system. If a loss of power of the currently operating engine is detected, the SEO mode autopilot function is preferably engaged depending on the autopilot upper modes engaged state or pilot intervention.

More specifically, if the pilot is passive and autopilot cruise upper modes such as altitude hold mode, indicated airspeed mode and heading or track modes are engaged, i. e. the pilot is hands-off, the SEO mode autopilot function preferably automatically engages and the inactive engine is automatically started as quickly as possible. Then, the SEO mode autopilot function preferably brings the rotorcraft into autorotation by pitching up using cyclic longitudinal control and lowering the collective control, compensates the yaw response due to the sudden loss of power by a pedal command, prevents the rotor speed to drop beyond a minim value, and recovers the rotor speed to nominal OEI rotor speed by adjusting the collective control. Subsequently, the sink rate of the rotorcraft is stabilized and the flight speed is reduced to minimum power required. When the inactive engine is started up and is running nominally, the initial flight state, i. e. the initial cruising altitude and/or the predetermined flight route is/are recovered. Furthermore, the power is controlled to OEI continuous power to adjust the maximum possible indicated airspeed at this power setting. Moreover, the SEO mode autopilot function preferably displays appropriate cautions, warnings and audios to inform the pilot on the current rotorcraft, autopilot and SEO function state. Finally, the SEO mode autopilot function may be adjusted for different optimization parameters, e. g. minimum height loss between the engine loss and the recovery of initial flight state or minimum time between engine loss and recovery of initial flight state. In addition, the SEO mode autopilot function might at least guide steering of the rotorcraft to possible safe landing areas by means of flight management system guidance commands.

However, if the pilot is attentive hands-off, or if the pilot is passive and the rotorcraft's autopilot is in basic mode with the pilot hands-off, a respective altitude and indicated airspeed mode is preferably engaged while recovering the initial flight state, for safety reasons.

If, in contrast thereto, the pilot is hands-on and actively flying the rotorcraft, then the SEO mode autopilot function does preferably not engage automatically. Nevertheless, the inactive engine is preferably automatically restarted as quickly as possible, whereas a sink rate and rotor speed are adjusted by the pilot while a visual guidance of a respective control commands setting in pitch, roll and collective is provided to the pilot via the SEO mode autopilot function through a flight director indication on the rotorcraft's display system, or by haptic feedback, i. e. by force feedback on the flying control. Furthermore, the SEO mode autopilot function preferably displays appropriate cautions, warnings and audios to inform the pilot on the current rotorcraft, autopilot and SEO mode function state.

However, if the pilot response to the engine failure is insufficient and the rotor speed is approaching a critical level, the vertical speed is rapidly increasing, or the indicated airspeed is approaching $V_{NE}$, the SEO mode autopilot function preferably engages automatically to secure the rotor speed, vertical speed or indicated airspeed of the rotorcraft by adjusting the pitch, roll, yaw and collective commands. In this case, the SEO mode autopilot function preferably also displays appropriate cautions, warnings and audios to inform the pilot on the current rotorcraft, autopilot and SEO mode function state.

More specifically, all cautions and warnings, as well as applicable procedure information, such as information on different procedure segments and modes, etc., may be displayed to the crew of the rotorcraft in the rotorcraft's primary flight display and in the navigation display. In addition, flight director indications in the primary flight display for collective position, pitch and roll attitudes may also be displayed. Furthermore, recommended landing sites may also be highlighted automatically in the navigation display or in the synthetic vision of the primary flight display.

In summary, the SEO mode autopilot function may advantageously be adjusted depending on a required or intended level of assistance to a pilot of a given rotorcraft. However, the respectively inactive engine is preferably in any case automatically started whereas only the level of assistance to the pilot is dependent on the pilot reaction and the rotorcraft function state. In particular, critical rotorcraft function states, such as excessive sink rates or low rotor speeds, are preferably automatically recovered by the SEO mode autopilot function for safety reasons.

More specifically, the grade of automated takeover of the SEO mode autopilot function is preferably configurable depending on the current rotorcraft, autopilot, and SEO mode function state, from fully automated to only partially automated combined with pilot action. Furthermore, as required from applicable certification specifications, the pilot can preferably always override the autopilot commands.

In any case, if restart of the inactive engine is not successful, the pilot of the rotorcraft preferably receives a warning. The SEO mode autopilot function will then perform an autorotation to a possible safe landing area determined by the rotorcraft's Flight Management System (FMS). In case the pilot takes over and manually autorotates the rotorcraft, the pilot gets an indication of collective command and pitch angle for optimal autorotation.

Still another one of the above-described objects is solved by a flight control system. More specifically, according to the present disclosure a flight control system is provided for a rotorcraft that comprises at least one main rotor with associated main rotor actuators, and at least two engines for powering the at least one main rotor, the rotorcraft being adapted for operating in an AEO mode wherein the at least two engines are powering the at least one main rotor, or in a SEO mode wherein only a first engine of the at least two engines is powering the at least one main rotor while a second engine of the at least two engines is inactive. The flight control system is configured for executing a SEO mode autopilot function during flight of the rotorcraft in cruise mode with an associated flight speed at an associated cruising altitude in the SEO mode if, during monitoring of the first engine, an engine failure of the first engine is detected. The SEO mode autopilot function implements the method described hereinabove.

The flight control system may be implemented as a conventional flight control system with a direct link between flying controls and the main rotor actuators, as well as tail rotor actuators, or as a fly-by-wire (FBW) flight control system with an electrical or optical link.

BRIEF DESCRIPTION OF DRAWINGS

Preferred embodiments of the disclosure are outlined by way of example in the following description with reference to the attached drawings. In these attached drawings, identical or identically functioning components and elements are labeled with identical reference numbers and characters and are, consequently, only described once in the following description.

DETAILED DESCRIPTION

Figure 1:
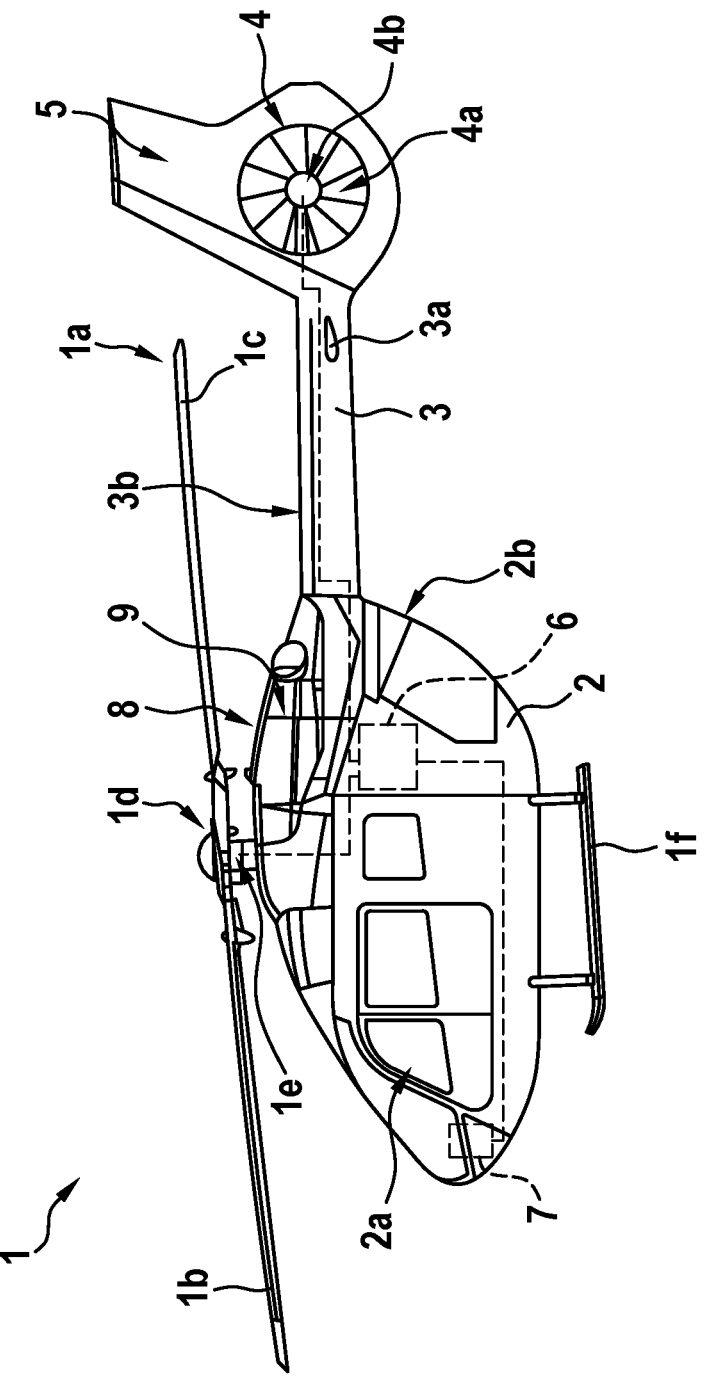
FIG. 1 shows a lateral view of an illustrative rotorcraft that comprises a flight control system configured to perform a method of operating the rotorcraft according to the present disclosure.

FIG. 1 shows an aircraft 1 that is illustratively embodied as a rotorcraft and, more particularly, as a helicopter. Thus, for purposes of simplicity and clarity, the aircraft 1 is hereinafter referred to as the "helicopter 1". The present disclosure is, however, not limited to helicopters and may likewise be applied to any other rotorcraft.

The helicopter 1 comprises at least one main rotor 1a, by way of example a multi-blade main rotor, for providing lift and forward or backward thrust during operation. By way of example, the at least one main rotor 1a comprises a plurality of rotor blades which are connected at an associated rotor head 1d to a rotor shaft, which rotates in operation of the helicopter 1 about an associated rotor axis. Two rotor blades of the plurality of rotor blades are illustratively separately labelled with the reference signs 1b, 1c.

The at least one main rotor 1a further comprises associated main rotor actuators 1e. Suitable actuators which may be used to implement the associated main rotor actuators are, however, well-known to the person skilled in the art, so that a detailed description thereof may be omitted, for brevity and conciseness.

According to the present disclosure, the helicopter 1 further comprises a flight control system (FCS) 6 for controlling at least the main rotor actuators 1e. Illustratively, the FCS 6 is also connected to associated flight controls 7 of the helicopter 1.

The FCS 6 may be implemented as a conventional flight control system with a direct link between the flight controls 7 and at least the main rotor actuators 1e, or as a fly-by-wire (FBW) flight control system with an electrical or optical link between the flight controls 7 and at least the main rotor actuators 1e.

Moreover, the helicopter 1 preferably comprises a fuselage 2 and a landing gear 1f which is only illustratively of the skid-type. By way of example, a left-hand side of the fuselage 2 is shown and, thus, a portside wall of the fuselage 2 of the helicopter 1. Illustratively, the fuselage 2 forms an aircraft interior region that accommodates a cockpit 2a and that may further accommodate a cabin for passengers and/or cargo. Moreover, the fuselage 2 may be connected at a rear fuselage 2b to a tail boom 3 with a horizontal stabilizer 3a. The tail boom 3 may be implemented as a slim beam element that comprises at least a tubular tail boom cone 3b.

Illustratively, the helicopter 1 further comprises at least one preferentially shrouded counter-torque device 4 configured to provide counter-torque during operation, i. e. to counter the torque created by rotation of the at least one rotor 1a for purposes of balancing the helicopter 1 in terms of yaw. The at least one counter-torque device 4 is illustratively provided at an aft section of the tail boom 3 and preferably comprises a tail rotor 4a. The aft section of the tail boom 3 may further comprise a fin 5.

Preferably, the tail rotor 4a further comprises associated tail rotor actuators 4b. Suitable actuators which may be used to implement the associated tail rotor actuators 4b are, however, well-known to the person skilled in the art, so that a detailed description thereof may be omitted, for brevity and conciseness. The FCS 6 is preferably also adapted for controlling the tail rotor actuators 4b.

According to the present disclosure, the helicopter 1 comprises at least two engines 8 for powering the at least one main rotor 1a in one of an AEO mode and a SEO mode. At this point, it should be noted that only an engine 9 is separately labeled in FIG. 1, as it is arranged on the left-hand side of the helicopter 1. However, the helicopter 1 is, by way of example, embodied with a twin-engine configuration having two engines which form the at least two engines 8 which, thus, comprise in addition to the engine 9 another engine that may e. g. be arranged on a right-hand side of the helicopter 1 such that it is not visible in FIG. 1.

It should further be noted that by way of example, and not for limiting the disclosure accordingly, the engine 9 is considered hereinafter to be the single engine that is active, i. e. operates in the SEO mode for powering the at least one rotor 1a. Accordingly, the other engine that may e. g. be arranged on the right-hand side of the helicopter 1 is considered hereinafter to be inactive in the SEO mode, i. e. either to have a combustion chamber that is not fired such that the engine is "sleeping", or to have a combustion chamber that is fired, but wherein the engine is in idle or super idle mode.

Figure 2:
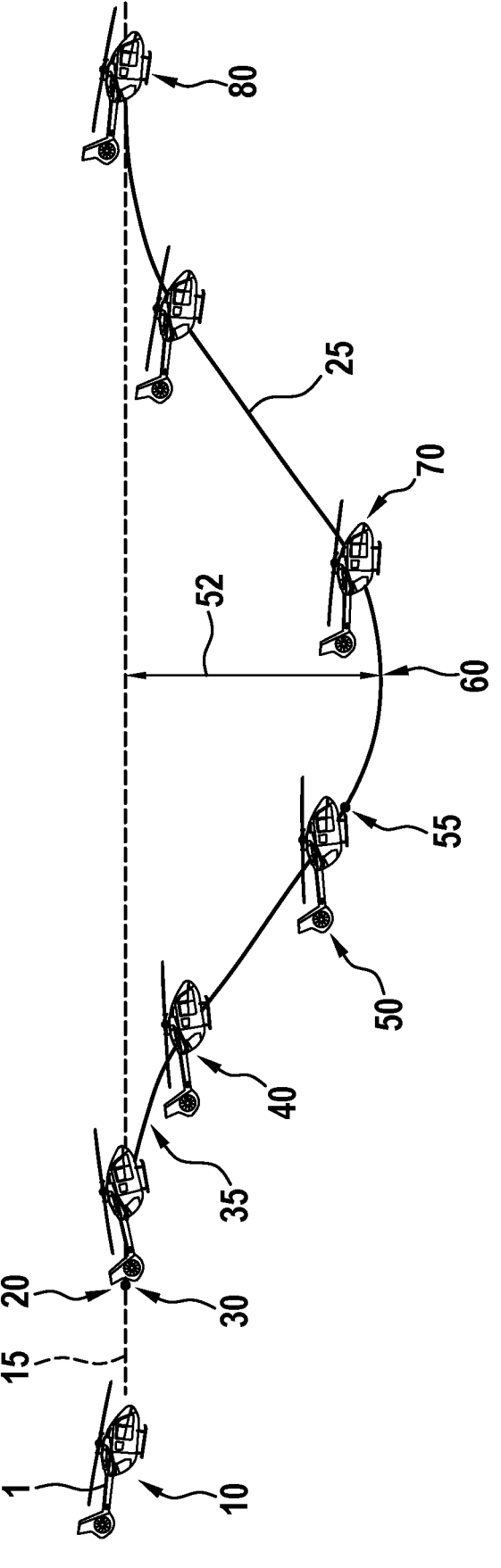
FIG. 2 shows a schematic view of a flight mission of the rotorcraft of FIG. 1.

FIG. 2 shows an illustrative flight mission of the helicopter 1 of FIG. 1 for exemplifying a method of operating the helicopter 1 according to the present disclosure. Therefore, the flight mission according to FIG. 2 is hereinafter described in detail with reference to components of the helicopter 1 of FIG. 1 which are particularly required for performing the method of operating the helicopter 1 according to the present disclosure.

As described above at FIG. 1, the helicopter 1 comprises the at least one main rotor 1*a* with the main rotor actuators 1*e*, the two engines 8 for powering the at least one main rotor 1*a*, and the FCS 6 for controlling at least the main rotor actuators 1*e*. The rotorcraft 1 may be operated in the AEO mode wherein the two engines 8 are powering the at least one main rotor 1*a*, or in the SEO mode wherein only the engine 9 of the two engines 8 is powering the at least one main rotor 1*a* while the other engine of the two engines 8 is inactive.

In FIG. 2, the helicopter 1 is initially flying in cruise mode with an initial flight speed at an initial cruising altitude 15. Then, as illustrated with the reference sign 10, the SEO mode is entered such that subsequently only the engine 9 is powering the at least one main rotor 1*a* while the other engine of the two engines 8 is rendered inactive. The engine 9 is, therefore, hereinafter referred to as the "active engine" whereas the other engine is hereinafter referred to as the "inactive engine", for simplicity and clarity.

As a result, the helicopter 1 continues flying in the cruise mode with the initial flight speed at the initial cruising altitude 15, but in addition also in the SEO mode. However, upon entering the SEO mode the FCS 6 preferably starts execution of a SEO mode autopilot function which, in response to determining that the helicopter 1 is operated in the SEO mode, monitors the active engine to enable detection of engine failures. By way of example, monitoring the active engine to enable detection of engine failures may comprise monitoring a current engine state of the active engine and/or monitoring a current rotor speed of the at least one main rotor 1*a* of the helicopter 1.

If, during monitoring of the active engine, an engine failure of the active engine is detected, as illustrated with the reference sign 20, the SEO mode autopilot function proceeds to entering the at least one main rotor 1*a* into autorotation, as illustrated with the reference sign 30, upon detection of the engine failure and as a result of power loss during operation of the helicopter 1 in the SEO mode. Preferably, entering the at least one main rotor 1*a* into autorotation comprises adjusting at least the main rotor actuators 1*e*.

More generally, collective pitch, cyclic and pedal commands and/or other aerodynamic surfaces, as well as the tail rotor actuators 4*b* of FIG. 1 may be adjusted. However, for simplicity and brevity reference is only and representatively made hereinafter to adjusting or re-adjusting at least the main rotor actuators 1*e*.

At this point, it should be noted that entering into autorotation a main rotor of a helicopter is well-known as such to the person skilled in the art. Therefore, a more detailed description thereof may be omitted, for brevity and conciseness.

Subsequently, as illustrated with the reference sign 35, a current rotor speed of the at least one main rotor 1*a* is adjusted to nominal autorotation rotor speed by re-adjusting at least the main rotor actuators 1*e*. Furthermore, as illustrated with the reference sign 40, a current flight speed of the helicopter 1 is reduced to a best rate of climb speed Vy or to a best range speed.

Moreover, as illustrated with the reference sign 50, the autorotation of the at least one main rotor 1*a* is stabilized. Stabilizing the autorotation of the at least one main rotor 1*a* may comprise minimizing height loss 52 of the helicopter 1 via an in-flight optimization of the current flight speed and the current rotor speed by further re-adjusting at least the main rotor actuators 1*e*. The height loss 52 is defined as a distance between the initial cruising altitude 15 and a flight curve 25 on which the helicopter 1 flies illustratively after detection of the engine failure and as a result of power loss during operation of the helicopter 1 in the SEO mode.

Furthermore, as illustrated with the reference sign 55, the inactive engine of the at least two engines 8 is restarted. Although restarting is illustratively shown and described to be performed preferably at a point in time when the autorotation of the at least one main rotor 1*a* is at least essentially stabilized, it may also be initiated immediately upon detection of the engine failure.

Once the inactive engine is restarted, the initial flight speed and the initial cruising altitude 15 may be recovered, as illustrated with the reference sign 60, by powering the at least one main rotor 1*a* using the restarted engine. Recovering the initial flight speed and the initial cruising altitude 15 may comprise re-adjusting, as illustrated with the reference sign 70, at least the main rotor actuators 1*e*.

After recovering the initial flight speed and the initial cruising altitude 15, flying in cruise mode with the initial flight speed at the initial cruising altitude 15 is resumed, as illustrated with the reference sign 80. Recovering the initial flight speed and the initial cruising altitude 15 is preferably done in an OEI mode wherein a safe continuation of flight is achieved by powering the at least one main rotor 1*a* only with the restarted engine of the at least two engines 8, while the other initially active engine of the at least two engines 8 is inoperative due to the detected engine failure.

At this point, it should be noted that the execution of the SEO mode autopilot function described hereinabove may be accompanied by visual and/or audible indications emitted e. g. by the FCS 6. More specifically, if during monitoring of the initially active engine 9 an engine failure of the initially active engine 9 is detected, visual and/or audible indications representing warnings and cautions may be emitted. Emitting visual and/or audible indications may comprise emitting procedure guidance to a pilot of the helicopter 1 for assisting the pilot in performing the method of operating the helicopter 1 as described hereinabove at least partially.

Finally, it should be noted that modifications to the above-described embodiments are within the common knowledge of the person skilled in the art and, thus, also considered as being part of the present disclosure. For instance, as described above at FIG. 2 the method of operating the helicopter preferably implies that the SEO mode autopilot function is automatically executed. More specifically, the SEO mode autopilot function is preferably at least armed without requiring a dedicated pilot action at the point in time when the SEO mode is entered, meaning that the SEO mode autopilot function is set into stand-by and initially only monitors the at least two engines and a current helicopter state for ensuring normal operation. Furthermore, the armament of the SEO mode autopilot function is preferably indicated to the pilot on the helicopter's display system. Then, if a loss of power of the currently operating engine, i. c. the active engine, is detected, the SEO mode autopilot function is preferably engaged and automatically performs the method of operating the helicopter as described above at FIG. 2.

However, instead of automatically performing the method of operating the helicopter as described above at FIG. 2, the SEO mode autopilot function may be adjusted depending on a required or intended level of assistance to a pilot of the helicopter 1 of FIG. 1. More specifically, a respective grade of automated takeover of the SEO mode autopilot function may be configurable depending on a current helicopter, autopilot, and SEO mode function state, preferably from fully automated to only partially automated combined with pilot action. Furthermore, as required from applicable certification specifications, the pilot may preferably always override respective autopilot commands.

However, the respectively inactive engine is preferably in any case automatically started by the SEO mode autopilot function and only the level of assistance to the pilot is adjusted dependent on pilot reaction and helicopter function state. In particular, critical helicopter function states, such as excessive sink rates or low rotor speeds, are preferably automatically recovered by the SEO mode autopilot function for safety reasons.

Furthermore, if restart of the inactive engine is not successful, the pilot of the helicopter preferably receives a corresponding warning. The SEO mode autopilot function then preferably performs an autorotation to a possible safe landing area determined by the helicopter's FMS. In case the pilot takes over and manually autorotates the helicopter, the pilot preferably gets at least an indication of collective command and pitch angle for optimal autorotation.

REFERENCE LIST 1 rotorcraft
1*a* multi-blade main rotor
1*b*, 1*c* rotor blades
1*d* rotor head
1*c* main rotor actuators
1*f* landing gear
2 fuselage
2*a* cockpit
2*b* rear fuselage
3 tail boom
3*a* horizontal stabilizer
3*b* tail boom cone
4 counter-torque device
4*a* tail rotor
4*b* tail rotor actuators
5 fin
6 flight control system
7 flight controls
8 rotorcraft engines
9 engine that is operative in SEO mode
10 entering SEO mode
15 initial SEO mode cruising altitude
20 identification of failure state
25 flight curve after identification of failure state
30 automated entry into autorotation
35 automated adjustment of rotor speed
40 automated reduction of flight speed
50 automated stabilization of autorotation
52 height loss
55 restart of engine that is inactive in SEO mode
60 automated recovery of initial SEO mode cruising altitude 70 flight controls adjustment during automated recovery of initial SEO mode cruising altitude
80 safe continuation of flight at initial cruising altitude

What is claimed is:

1. A method of operating a rotorcraft that is flying in cruise mode with an associated flight speed at an associated cruising altitude, wherein the rotorcraft comprises at least one main rotor with associated main rotor actuators, at least two engines for powering the at least one main rotor, and a flight control system for controlling at least the main rotor actuators, the method comprising:

determining whether the rotorcraft is operated in an All Engines Operative mode wherein the at least two engines are powering the at least one main rotor, or in a Single Engine Operation mode wherein only a first engine of the at least two engines is powering the at least one main rotor while a second engine of the at least two engines is inactive;

in response to determining that the rotorcraft is operated in the Single Engine Operation mode, monitoring the first engine that is powering the at least one main rotor to enable detection of engine failures; and if during monitoring of the first engine an engine failure of the first engine is detected, entering into autorotation of the at least one main rotor upon detection of the engine failure by adjusting at least the main rotor actuators;

wherein the method further comprises:

adjusting a current rotor speed of the at least one main rotor to nominal autorotation rotor speed by re-adjusting at least the main rotor actuators.

2. The method of claim 1, further comprising:

reducing a current flight speed of the rotorcraft to a best rate of climb speed or to a best range speed.

3. The method of claim 2, further comprising:

stabilizing the autorotation of the at least one main rotor.

4. The method of claim 3, wherein stabilizing the autorotation of the at least one main rotor comprises minimizing height loss of the rotorcraft via an in-flight optimization of the current flight speed and the current rotor speed by further re-adjusting at least the main rotor actuators.

5. The method of claim 4, further comprising:

restarting the second engine of the at least two engines, which is inactive in the Single Engine Operation mode.

6. The method of claim 5, wherein restarting of the second engine of the at least two engines, which is inactive in the Single Engine Operation mode, is initiated upon detection of the engine failure.

7. The method of claim 5, further comprising:

recovering the associated flight speed and the associated cruising altitude by powering the at least one main rotor using the restarted second engine.

8. The method of claim 7, wherein recovering the associated flight speed and the associated cruising altitude comprises re-adjusting at least the main rotor actuators.

9. The method of claim 8, further comprising:

resuming flying in cruise mode with the associated flight speed at the associated cruising altitude in an One Engine Inoperative mode wherein only the second engine of the at least two engines is powering the at least one main rotor while the first engine of the at least two engines is inoperative due to the detected engine failure.

10. The method of claim 1, further comprising, if during monitoring of the first engine an engine failure of the first engine is detected:

emitting visual and/or audible indications representing warnings and cautions.

11. The method of claim 10, wherein emitting visual and/or audible indications further comprises emitting procedure guidance to a pilot of the rotorcraft for assisting the pilot.

12. A rotorcraft comprising at least one main rotor with associated main rotor actuators, at least two engines for powering the at least one main rotor, and a flight control system for controlling at least the main rotor actuators, the rotorcraft being adapted for operating in an All Engines Operative mode wherein the at least two engines are powering the at least one main rotor, or in a Single Engine Operation mode wherein only a first engine of the at least two engines is powering the at least one main rotor while a second engine of the at least two engines is inactive, wherein the flight control system executes a Single Engine Operation mode autopilot function during flight of the rotorcraft in cruise mode with an associated flight speed at an associated cruising altitude in the Single Engine Operation mode if, during monitoring of the first engine, an engine failure of the first engine is detected, and wherein the Single Engine Operation mode autopilot function implements the method according to claim 1.

13. The rotorcraft of claim 12, wherein the flight control system immediately restarts the second engine of the at least two engines, which is inactive in the Single Engine Operation mode, if the Single Engine Operation mode autopilot function is executed.

14. A flight control system for a rotorcraft that comprises at least one main rotor with associated main rotor actuators, and at least two engines for powering the at least one main rotor, the rotorcraft being adapted for operating in an All Engines Operative mode wherein the at least two engines are powering the at least one main rotor, or in a Single Engine Operation mode wherein only a first engine of the at least two engines is powering the at least one main rotor while a second engine of the at least two engines is inactive, wherein the flight control system is configured for executing a Single Engine Operation mode autopilot function during flight of the rotorcraft in cruise mode with an associated flight speed at an associated cruising altitude in the Single Engine Operation mode if, during monitoring of the first engine, an engine failure of the first engine is detected, and wherein the Single Engine Operation mode autopilot function implements the method according to claim 1.

15. A method of operating a rotorcraft flying in cruise mode, wherein the rotorcraft comprises a rotor with associated rotor actuators, two engines for powering the rotor, and a flight control system for controlling the rotor actuators, the method comprising:

determining whether the rotorcraft is operating in an All Engines Operative mode wherein the two engines power the rotor, or in a Single Engine Operation mode wherein only a first engine of the two engines power the rotor while a second engine of the two engines is inactive;

in response to determining that the rotorcraft is operated in the Single Engine Operation mode, monitoring the first engine to enable detection of engine failures; and if during monitoring of the first engine an engine failure of the first engine is detected, entering into autorotation of the rotor upon detection of the engine failure by adjusting the rotor actuators;

wherein the method further comprises:

adjusting a current rotor speed of the rotor to a predetermined autorotation rotor speed by re-adjusting the rotor actuators.

16. The method of claim 15, further comprising:

upon detection of the engine failure, restarting the second engine of the two engines, which is inactive in the Single Engine Operation mode, to power the rotor using the restarted second engine, wherein recovering cruise mode conditions occur upon re-adjusting at the rotor actuators after restarting the second engine.

17. The method of claim 15, further comprising:

resuming flying in cruise mode in a One Engine Inoperative mode wherein only the second engine of the two engines powers the rotor while the first engine is inoperative due to the detected engine failure.

18. The method of claim 15, further comprising, if during monitoring of the first engine an engine failure of the first engine is detected:

emitting visual and/or audible indications representing warnings and cautions.

19. A method of operating a rotorcraft, wherein the rotorcraft comprises a main rotor with an associated main rotor actuator, two engines for powering the main rotor, and a flight control system for controlling the main rotor actuator, the method comprising:

determining whether the rotorcraft is operated in an All Engines Operative mode wherein the two engines are powering the main rotor, or in a Single Engine Operation mode wherein only a first engine of the two engines is powering the main rotor while a second engine of the two engines is inactive;

after determining that the rotorcraft is operated in the Single Engine Operation mode, monitoring the first engine powering the main rotor to enable detection of engine failures; and if during monitoring of the first engine an engine failure of the first engine is detected, emitting a visual and/or audible indication, and upon detection of the engine failure, adjusting the main rotor actuator to enter the main rotor into autorotation.

20. The method of claim 19, wherein the method further comprises:

adjusting a current rotor speed of the main rotor to a predetermined autorotation rotor speed by re-adjusting the main rotor actuator.

* * * * *